United States Patent
Mozaffari et al.

(10) Patent No.: US 12,197,823 B1
(45) Date of Patent: Jan. 14, 2025

(54) TECHNIQUES FOR MODELING LARGE DIAMETER MONOPILES

(71) Applicant: Bentley Systems, Incorporated, Exton, PA (US)

(72) Inventors: Navid Mozaffari, Metairie, LA (US); Parvinder Jhita, Kenner, LA (US)

(73) Assignee: Bentley Systems, Incorporated, Exton, PA (US)

( * ) Notice: Subject to any disclaimer, the term of this patent is extended or adjusted under 35 U.S.C. 154(b) by 804 days.

(21) Appl. No.: 17/380,671

(22) Filed: Jul. 20, 2021

(51) Int. Cl.
  *G06F 30/13* (2020.01)
  *G06F 111/10* (2020.01)

(52) U.S. Cl.
  CPC .......... *G06F 30/13* (2020.01); *G06F 2111/10* (2020.01)

(58) Field of Classification Search
  CPC ....... G06F 30/00; G06F 30/13; G06F 2111/10
  USPC .............................................. 703/1
  See application file for complete search history.

(56) References Cited

U.S. PATENT DOCUMENTS

2016/0326708 A1* 11/2016 Sinnreich ................ E02D 1/022

FOREIGN PATENT DOCUMENTS

| CN | 112861409 A | * | 5/2021 | ............. G06F 30/13 |
| CN | 118110193 A | * | 5/2024 | |

OTHER PUBLICATIONS

Alderlieste, Etienne, et al., "Experimental Investigation into Pile Diameter Effects of Laterally Loaded Mono-Piles," ASME, Proceedings of the ASME 2011 30th International Conference on Ocean, Offshore and Arctic Engineering, OMAE2011, OMAE2011-50068, Rotterdam, The Netherlands, Jun. 19-24, 2011, pp. 1-6.
Allotey, Nii, et al., "Generalized Dynamic Winkler Model for Nonlinear Soil-Structure Interaction Analysis," NRC Canada, NRC Research Press Web, Canada Geotechnical Journal, vol. 45, May 5, 2008, pp. 560-573.
Brinkgreve, Ronald, et al., "Validation and Application of A New Software Tool Implementing the PISA Design Methodology," MDPI, Journal of Marine Science and Engineering, vol. 8, No. 457, Jun. 21, 2020, pp. 1-17.
Bouman, Thijs, "A Winkler Model for the Seismic Analysis of Monopile Foundations: An Exploratory Study on the Modeling of Soil-Structure Interaction During Earthquakes," NTNU—Norwegian University of Science and Technology, Department of Marine Technology, Dec. 2018, pp. 1-106.
Burd, Harvey J., et al., "Application of the PISA Design Model to Monopiles Embedded in Layered Soils," ICE Publishing, Geotechnique, vol. 70, No. 11, Sep. 14, 2020, pp. 1067-1082.
Burd, Harvey J., et al., "New Data Analysis Methods for Instrumented Medium-Scale Monopile Field Tests," ICE Publishing, Geotechnique, vol. 70, No. 11, Nov. 15, 2019, pp. 961-969.

(Continued)

*Primary Examiner* — Cedric Johnson
(74) *Attorney, Agent, or Firm* — Cesari and McKenna, LLP; James A. Blanchette

(57) ABSTRACT

In example embodiments, a new model for modeling monopiles in is provided that, in addition to distributed lateral load along the monopile, considers distributed moment along the length of the pile, base moment at the pile tip, and base shear force at the pile tip. The new model may avoid the overly conservative designs for large diameter piles (e.g., 10 m+) with small length-to-diameter ratios (e.g., <6), while using standardized reaction curves (i.e., p-y curves and t-z curves) and considering axial and combined loading.

20 Claims, 8 Drawing Sheets

(56) References Cited

OTHER PUBLICATIONS

Burd, H. J., et al., "PISA Design Model for Monopiles for Offshore Wind Turbines: Application to a Marine Sand," ICE Publishing, Geotechnique, vol. 70, No. 11, Feb. 12, 2020, pp. 1048-1066.

Byrne, Byron W., et al., "Monotonic Laterally Loaded Pile Testing in a Stiff Glacial Clay Till at Cowden," ICE Publishing, Geotechnique, vol. 70, No. 11, Nov. 15, 2019, pp. 970-985.

Byrne, Byron W., et al., "PISA Design Model for Monopiles for Offshore Wind Turbines: Application to a Stiff Glacial Clay Till," ICE Publishing, Geotechnique, vol. 70, No. 11, Feb. 6, 2020, pp. 1030-1047.

Gerolymos, Nikos, et al., "Winkler Model for Lateral Response of Rigid Caisson Foundations in Linear Soil," Elsevier Ltd, Elsevier, Soil Dynamics and Earthquake Engineering, vol. 26, Jan. 24, 2006, pp. 347-361.

Gupta, B. K., et al., "Applicability of Timoshenko, Euler-Bernoulli and Rigid Beam Theories in Analysis of Laterally Loaded Monopolies and Piles," ICE Publishing, Geotechnique, vol. 68, No. 9, Jan. 3, 2018, pp. 772-785.

Haiderali, A. E., et al., "Evaluation of the P-Y Method in the Design of Monopiles for Offshore Wind Turbines," Offshore Technology Conference, OTC 24088, Houston, Texas, USA, May 6-9, 2013, pp. 1-21.

Lam, Ignatius, P. O., "Diameter Effects on P-Y Curves," Deep Foundations Institute, Jan. 1, 2013, pp. 1-15.

Mcadam, Ross A., et al., "Monotonic Laterally Loaded Pile Testing in a Dense Marine Sand at Dunkirk," ICE Publishing, Geotechnique, vol. 70, No. 11, Nov. 15, 2019, pp. 986-998.

Ming-Yuan, Wang, et al., A Dynamic Winkler Model to Analyze Offshore Monopile in Clayey Foundation Under Cyclic Load, EJGE, vol. 21, Bund. 2, Jan. 2016, pp. 2029-2041.

Terceros, M., et al., "Evaluation of P-Y Approaches for Piles in Soft Clay," SUT—Society for Underwater Technology, Smarter Solutions for Future Offshore Developments, Pile Design and Installation, OSIG 2017, Sep. 12, 2017, pp. 724-731.

Zdravkovic, Lidija, et al., "Finite-Element Modelling of Laterally Loaded Piles in a Stiff Glacial Clay Till at Cowden," ICE Publishing, Geotechnique, vol. 70, No. 11, Nov. 15, 2019, pp. 999-1013.

Zdravkovic, Lidija, et al., "Ground Characterisation for PISA Pile Testing and Analysis," ICE Publishing, Geotechnique, vol. 70, No. 11, Nov. 15, 2019, pp. 945-960.

* cited by examiner

TECHNIQUES FOR MODELING LARGE DIAMETER MONOPILES

BACKGROUND

Technical Field

The present disclosure relates generally to structural analysis and design software, and more specifically to techniques for modeling monopiles (e.g., large diameter monopiles with small length-to-diameter ratios) in structural analysis and design software.

Background Information

Wind, either onshore or offshore, has been recognized as an abundant source of clean, renewable energy. Offshore wind is of particular interest as it is available over large continuous areas, offers stable and high wind speeds with low turbulence and wind shear, and can better address issues of noise and visual impact than onshore wind. To be able to compete with other sources of energy, the life cycle cost of offshore wind projects needs to be minimized. On average, the support structures and foundations for an offshore wind project accounts for about 13% of the total life cycle cost. In order to minimize this portion of the cost, support structure and foundation designs should be safe and effective, but not overly conservative.

Monopiles are recognized as the most cost-effective type of foundation for fixed offshore wind turbines in water depths of up to 40 meters (m). Until recently, most monopiles have been of relatively small diameter (e.g., 5-6 m) with large length-to-diameter ratios. Currently, there is increasing interest in large diameter monopiles (e.g., 10 m+) with small length-to-diameter ratios (e.g., ≤6, for instance ≥2 but ≤6). Such large diameter monopiles may be better suited for deep water installations, where they may support larger wind turbines subject to higher wind, wave and current loads. However, existing techniques for modeling monopiles often lead to overly conservative designs for large diameter monopiles. Conventional structural analysis and design software often uses the "Winkler Model" that models a monopile as a beam supported by a series of nonlinear springs that represent soil response. In the Winkler Model, soil response consists of distributed lateral load along the pile only. That is, the lateral soil reaction force (p) at a particular point on the pile is a function of the lateral displacement (y) at the point solely. A nonlinear function referred to as a p-y curve is employed which relates p to y. Different p-y curves have been determined over the years for different soil types through field testing. The Winkler Model has proven well suited to the design of slender piles (e.g., <1 m) with large length-to-diameter ratios (e.g., >30), for example, those used in offshore jacket structures employed by the oil and gas industry. However, the Winkler Model typically leads to overly conservative designs for large diameter piles (e.g., 10 m+) with small length-to-diameter ratios (e.g., ≤6, for instance ≥2 but ≤6). Concurrent wind, wave and current loads may produce a large overturning moment, and the Winkler Model typically does not adequately capture this behavior.

Recently, attempts have been made to replace use of the Winkler Model in structural analysis and design software with a new model referred to as the Pile-Soil Analysis (PISA) Model. The PISA Model introduces three other soil reactions, namely: distributed moment along the length of the pile, base moment at the pile tip, and base shear force at the pile tip. Although the PISA Model has shown promise in the design of monopiles, it too suffers shortcomings. The PISA Model only considers lateral loading and does not consider axial or combined loading on a pile, which may play an important role due to gravity loading of the supported structure. Further, the PISA Model requires new soil reaction curves which generally need to be determined for different soil types through new field testing. Such new soil reaction curves have not yet been standardized.

Accordingly, there is a need for improved techniques for modeling monopiles (e.g., large diameter monopiles with small length-to-diameter ratios) in structural analysis and design software.

SUMMARY

In example embodiments, a new model for modeling monopiles (e.g., large diameter monopiles) in structural analysis and design software is provided that, in addition to distributed lateral load along the monopile, considers distributed moment along the length of the pile, base moment at the pile tip, and base shear force at the pile tip. The new model may avoid overly conservative designs for large diameter piles (e.g., 10 m+) with small length-to-diameter ratios (e.g., ≤6, for instance ≥2 but ≤6), while using standardized reaction curves (i.e., p-y curves and t-z curves) and considering axial and combined loading.

In one example embodiment, structural analysis and design software accesses a p-y curve and a t-z curve for a type of soil about a monopile at each of one or more layers, the monopile including a plurality of nodes in the one or more layers. As understood in the field, each p-y curve is a nonlinear function that relates lateral soil reaction force (p) to lateral displacement (y), and each t-z curve is a nonlinear function that relates skin friction (t) to vertical displacement (z). The software determines a distributed moment along the monopile and based thereon a rotational stiffness of a given node, wherein the rotational stiffness is calculated as a function of both force per unit area from a respective t-z curve for the layer of the given node and slope of the respective t-z curve for the layer of the given node. The software determines a base moment at the monopile's tip and based thereon a base rotational stiffness, wherein the base rotational stiffness is calculated as a function of both force per unit area from a respective p-y curve for the layer of the pile tip and slope of the respective p-y curve for the layer of the pile tip. The software also determines a base shear force at the pile tip and based thereon base shear stiffness, wherein the base shear stiffness is calculated as a function of slope of a respective t-z curve for the layer of the pile tip and pile tip area. The software iteratively solves a system of non-linear equations that uses a structural stiffness matrix that includes the rotational stiffness, the base rotational stiffness and the base shear stiffness in addition to pile material structural stiffness to model the monopile, and eventually outputs a description of the modeled monopile.

It should be understood that a variety of additional features and alternative embodiments may be implemented other than those discussed in this Summary. This Summary is intended simply as a brief introduction to the reader and does not indicate or imply that the examples mentioned herein cover all aspects of the disclosure or are necessary or essential aspects of the disclosure.

BRIEF DESCRIPTION OF THE DRAWINGS

The description below refers to the accompanying drawings of example embodiments, of which.

DETAILED DESCRIPTION

Figure 1:
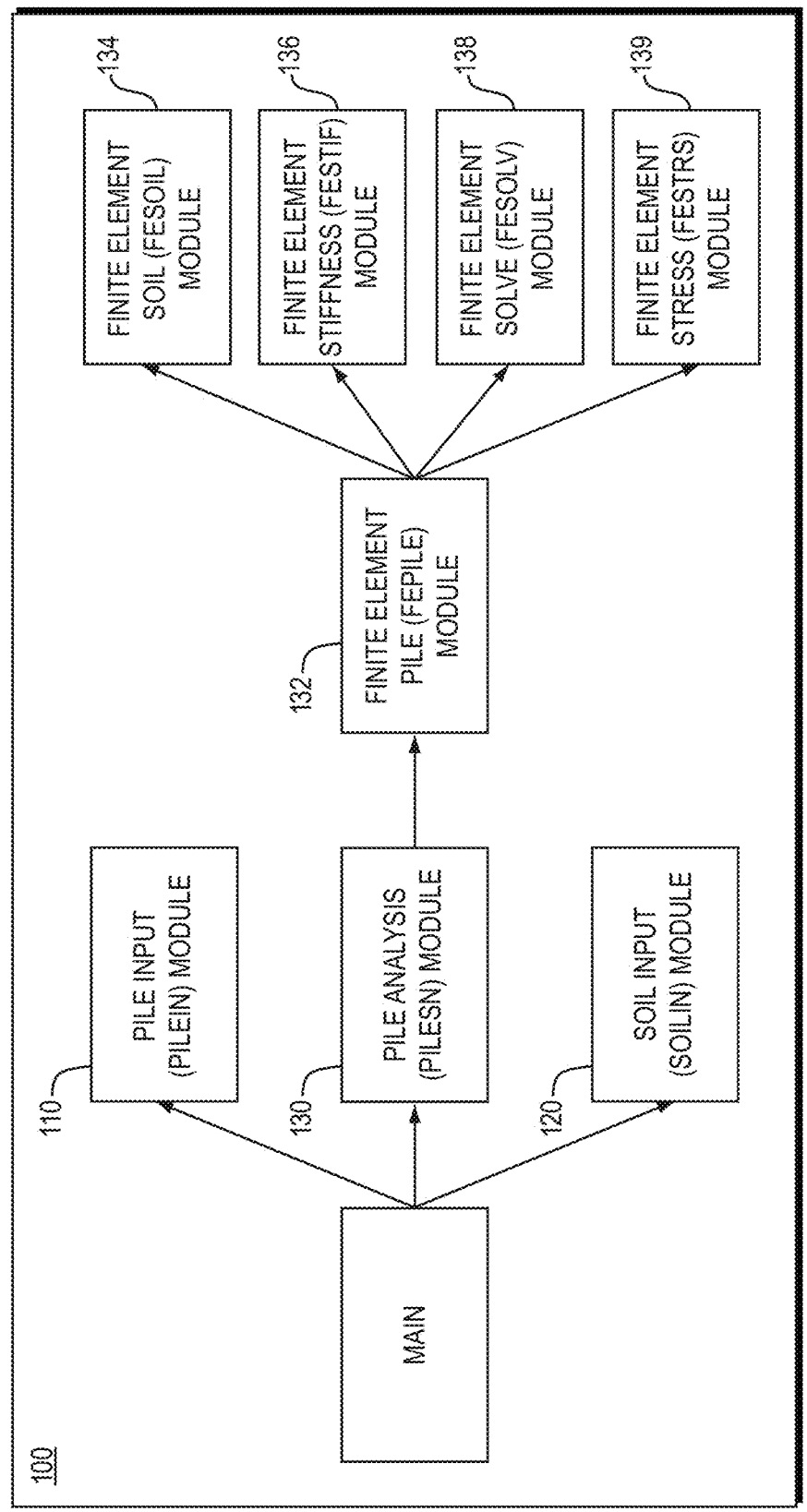
FIG. 1 is a high-level block diagram of an example software architecture in which the new model for modeling monopiles may be used.

FIG. 1 is a high-level block diagram of an example software architecture 100 in which the new model for modeling monopiles may be used. The software architecture may be executed on one or more computing devices arranged locally to an end-user ("local devices") and/or on one or more computing devices remote from the end-user ("cloud computing devices") accessible via a network (e.g., the Internet). Each computing device may include processors, memory/storage device, a display screen, and/or other hardware for executing software, storing data and/or displaying information.

The example software architecture may be a portion of structural analysis and design software. In one embodiment, the structural analysis and design software may be the SACS™ software available from Bentley Systems, Inc. and the portion may be part of the Pile 3D™ module of such software. It should be remembered, however, that the new model for modeling monopiles may also be implemented using different structural analysis and design software and/or different portions thereof.

In one example embodiment, three sub modules of the Pile 3D™ module may perform the major operations needed to model a monopile. A pile input (pilein) module 110 may read input data regarding pile material and geometry from a repository (not shown). Likewise, a soil input (soilin) module 120 may read input data regarding soil properties for the soil about the pile form the repository. Behaviors of soil typically can be modeled based on standardized reaction curves, and the soil input (soilin) module 120 may be responsible for accessing those curves, when needed. When the new model for modeling monopiles is to be utilized, the soil input (soilin) module 120 may be responsible for fetching a p-y curve and t-z curve for the type of soil about the monopile at each of several layers in the soil. Soil type may differ along the pile with its characteristics varying by depth. A pile analysis (pilesn) module 130 may perform finite element (FE) analysis to model the monopile.

A number of further submodules make up modules 110-120 and be responsible for various subtasks. A FE pile (fepile) module 132 may organize the other submodules. A FE soil (fesoil) module 134 may be responsible for calculating soil stiffness components and corresponding soil resistance forces. The new model for modeling monopiles may be implemented mainly in the FE soil (fesoil) module 134.

A FE stiffness (festif) module 136 may assemble the soil stiffness components and corresponding soil resistance forces and as three springs attached to nodes along the pile and three springs attached to the pile tip and add them to a structural stiffness matrix that describes pile material structural stiffness and to a load vector that describes load on the pile. Rotational stiffness at a given element along the monopile, base rotational stiffness of the monopile and base shear stiffness of the monopile calculated as part of the new model may be added to an appropriate degree of freedom in the structural stiffness matrix by the FE stiffness (festif) module 136. The size of the structural stiffness matrix and load vector may depend on a number of elements the pile is divided into (e.g., 100 to 1000). In some implementations the number of elements may be user selectable. Give n elements of the pile, the load vector may be a on by 1 vector and the structural stiffness matrix may be a 6n by 6n matrix. Loading on top of the pile may be divided into a number of load steps m (e.g., 100 to 10000). In some implementations, the number of load step may be user selectable.

A FE solver (fesolve) 138 module may iteratively solve a system of non-linear equations, updating the structural stiffness matrix and load vector over each of the load steps, until convergence, in order to model the monopile. Depending on the size of the load steps, the number of iterations to achieve convergence may vary (e.g., up to 1000 iterations). Further, a FE stress (frstrs) module 139 may calculate internal stresses, stains and perform code checks to determine whether the monopile meets code requirements.

Figure 2A:
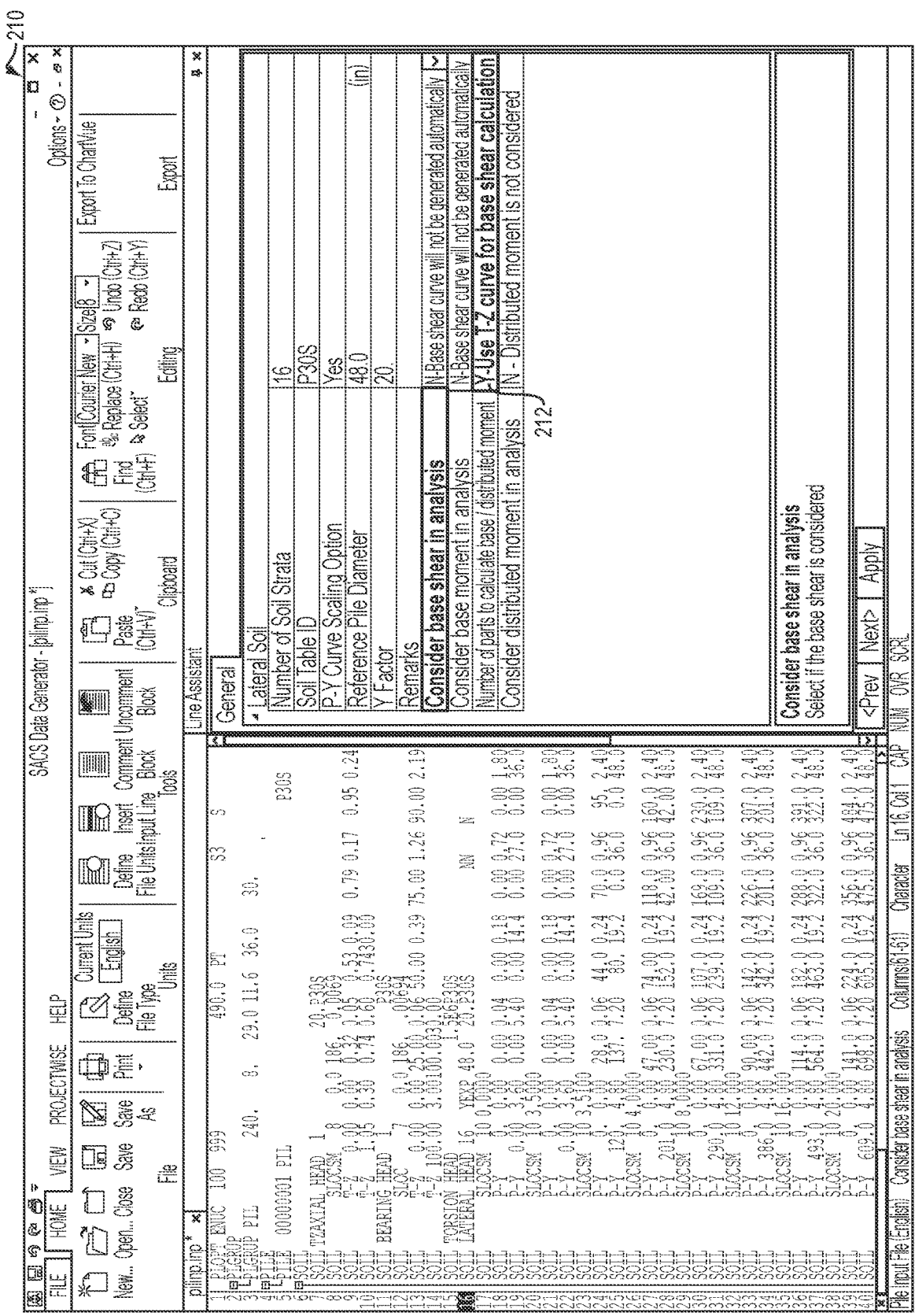
FIGS. 2A-2C are screen shots of an example user interface of the structural analysis and design software.
Figure 2B:
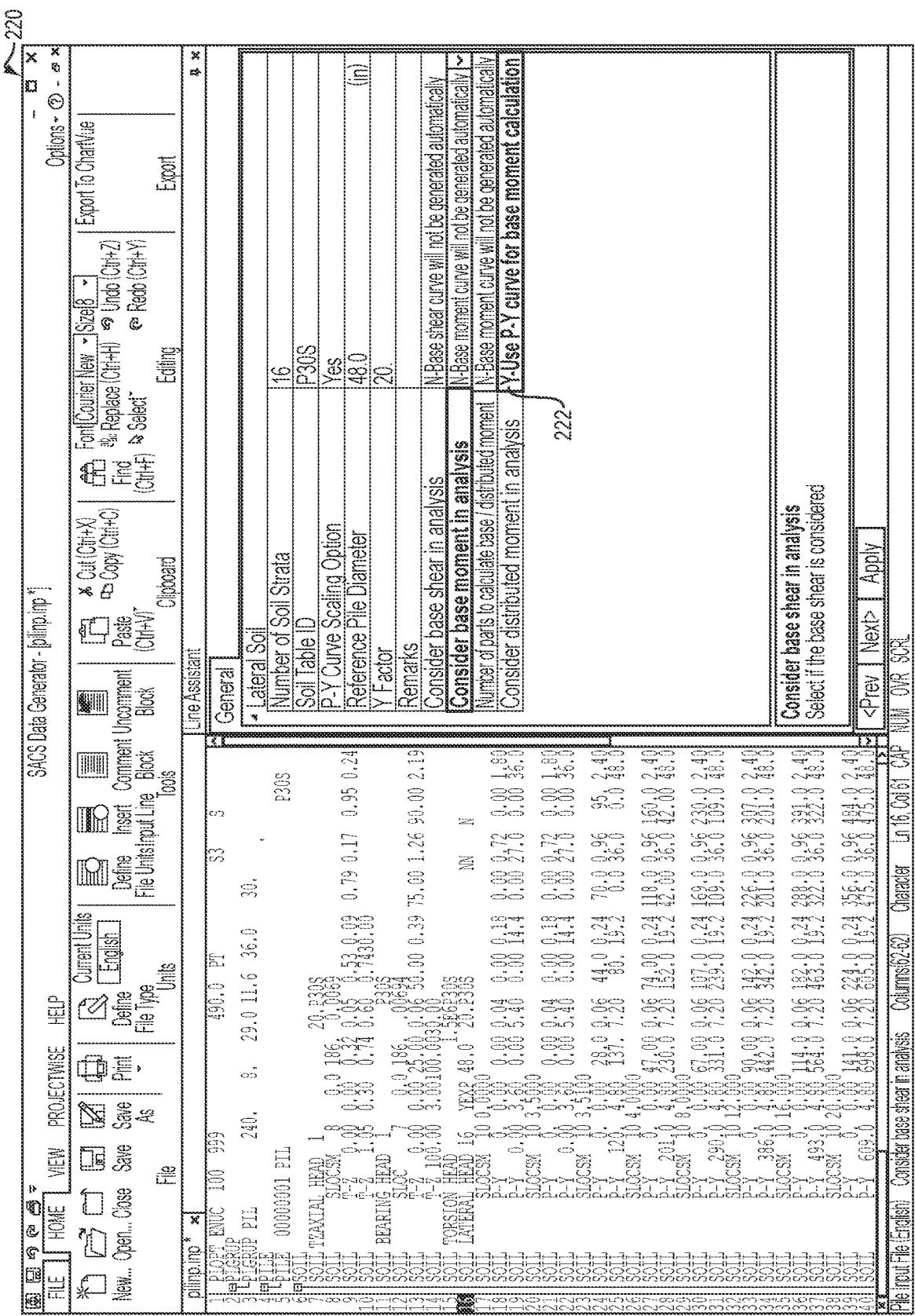
Figure 2C:
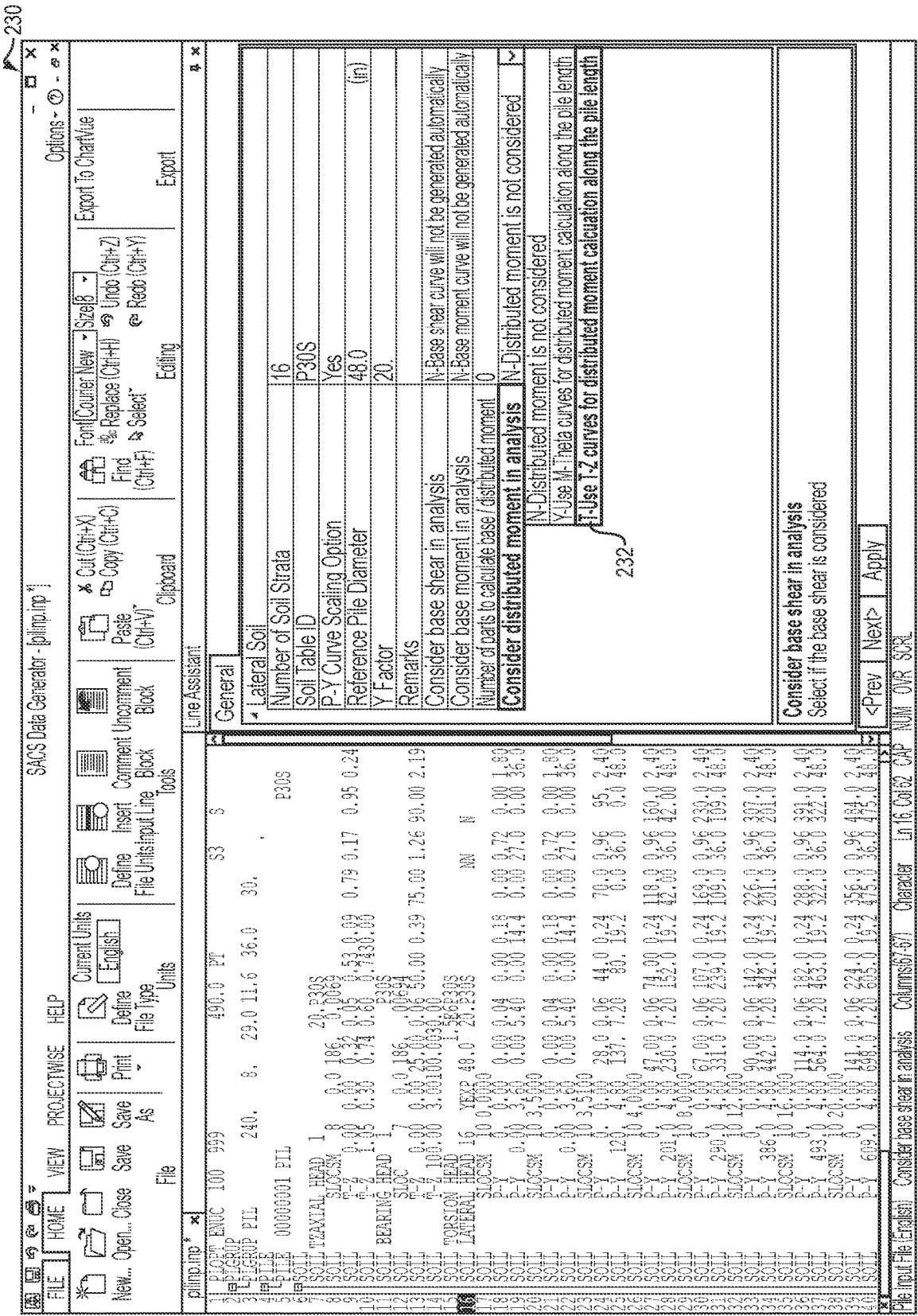

In one embodiment, the new model for modeling monopiles may be activated in the structural analysis and design software using options in input lines, configured in a user interface of the software. FIGS. 2A-2C are screen shots 210-230 of an example user interface of the structural analysis and design software. A first option 212 may be selected to consider distributed moment along the length of the pile using a t-z curve. A second option 222 may be selected to consider base moment at the pile tip using a p-y curve. A third option 232 may be selected to consider base shear force at the pile tip using a t-z curve.

The new model for modeling monopiles may be based on the foundations of the traditional Winkler Model. As discussed above, the Winkler Model assumes that lateral soil reaction force (p) at a particular point on the pile is a function of the lateral displacement (y) at the point solely, which is represented by a p-y curve. A similar assumption may be made that the soil reaction force due to skin friction (t) is a function of displacement (z) along with friction force on the surface, which is represented by a nonlinear function referred to as a t-z curve.

Figures 3A, 3B:
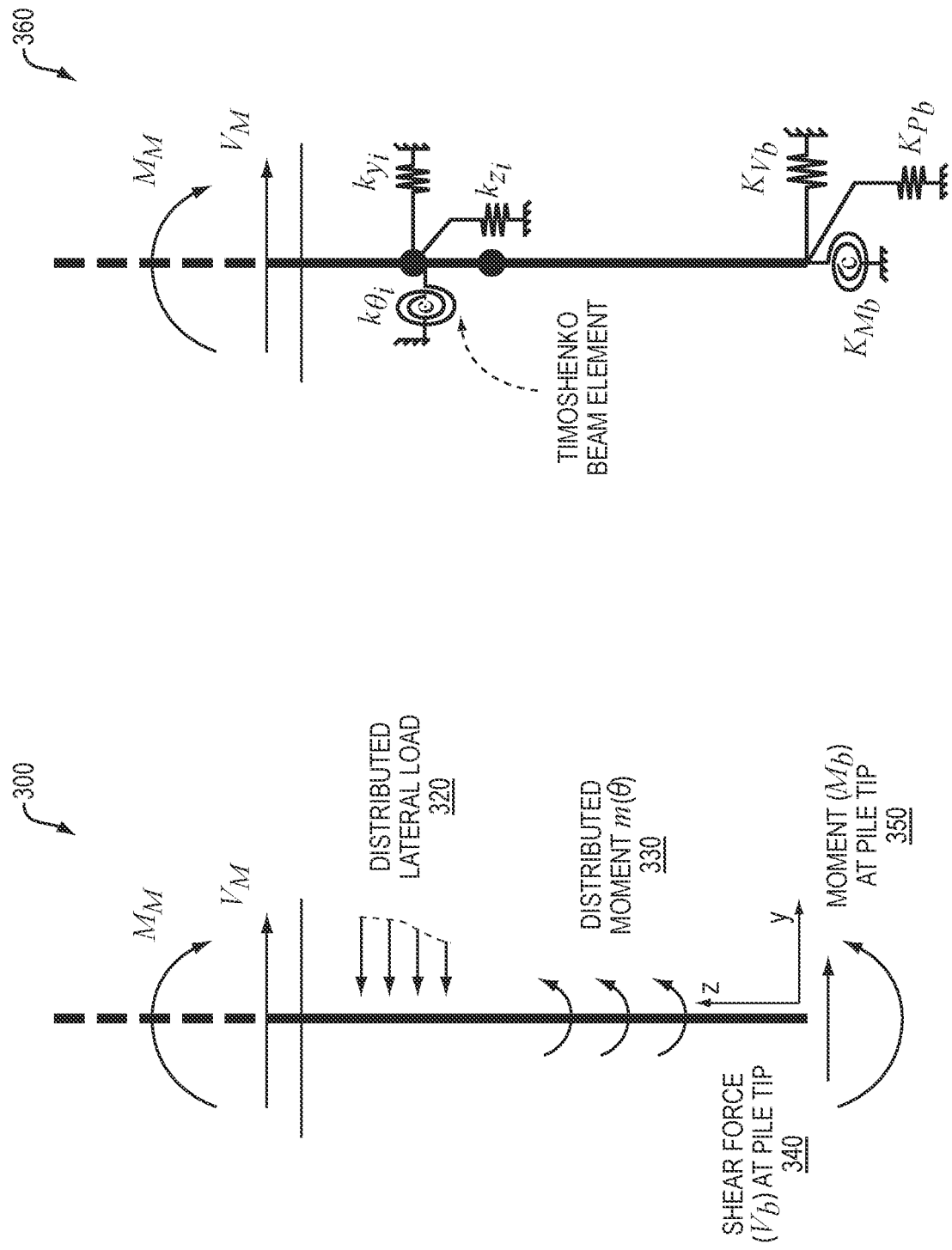
FIG. 3A is a diagram showing soil reactions on an example simplified one-dimensional (1D) representation of a monopile, including distributed lateral load, distributed moment, shear force at the pile tip, and moment at the pile tip.
FIG. 3B is a diagram representing soil reactions on an example simplified 1D representation of a monopile as three springs attached to nodes along the pile and three springs attached to the pile tip.

While the traditional Winkler Model assumes soil reaction includes only distributed lateral load along the pile, three other soil reactions may be desirable to include when designing large diameter piles (e.g., 10 m+) with small length-to-diameter ratios (e.g., ≤6, for instance ≥2 but ≤6), namely distributed moment, shear force at the pile tip, and moment at the pile tip. FIG. 3A is a diagram 300 showing soil reactions on a simplified 1D representation of a monopile, including distributed lateral load 320, distributed moment 330, shear force at the pile tip 340, and moment at the pile tip 350. The new model for modeling monopiles may relate the additional soil reactions 330, 340, to p-y curves and t-z curves and calculate from them rotational stiffness at a given element along the monopile, base rotational stiffness of the monopile and base shear stiffness of the monopile.

The reactions shown in FIG. 3A may be represented as a series of nonlinear springs. FIG. 3B is a diagram 360 representing soil reactions on a simplified 1D representation of a monopile as three springs attached to nodes along the pile and three springs attached to the pile tip. The simplified 1D representation may be divided into a plurality of nodes i along its length that each correspond to elements along the pile's surface. End bearing stiffness $K_{P_b}$, lateral stiffness $k_{y_i}$ of a given node and axial stiffness $k_{z_i}$ of a given node may be determined directly by standardized reaction curves. Rotational stiffness $k_{\theta_i}$ of a given node, base rotational stiffness $K_{M_b}$ and base shear stiffness $K_{V_b}$ may be calculated based on distributed lateral load, distributed moment, and shear force at the pile tip, respectively, as explained in detail below.

Figure 4A:
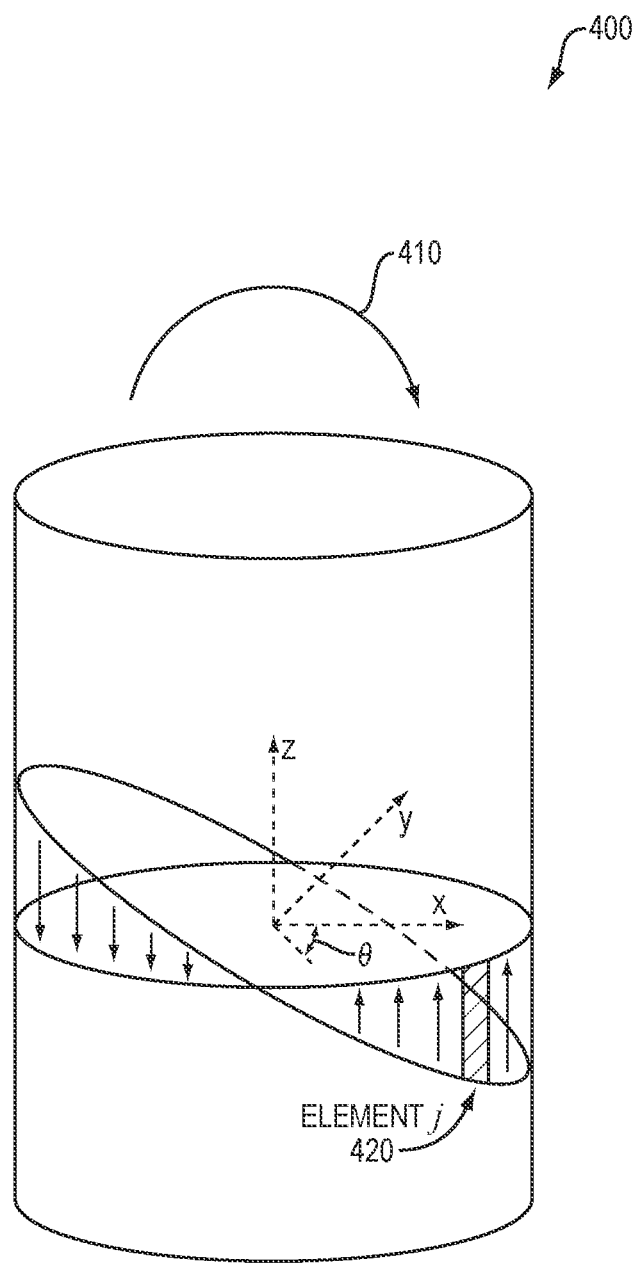
FIG. 4A is a diagram of an example monopile of radius R with applied moment around the y-axis, with a rotated horizonal plane of angle θ.
Figure 4B:
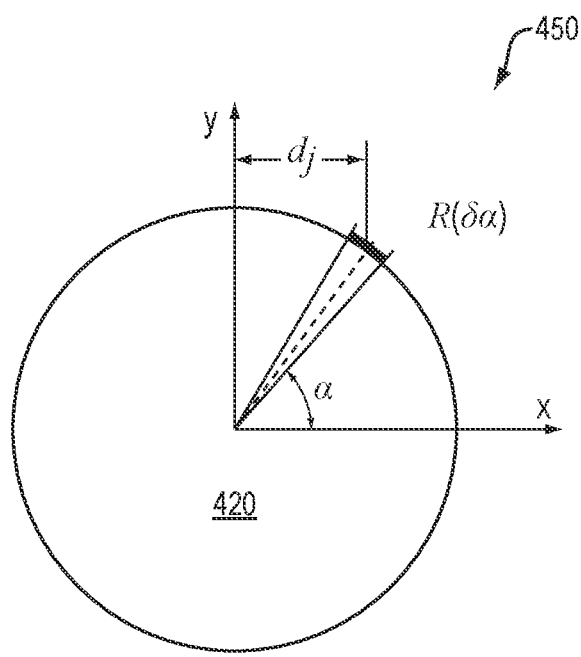
FIG. 4B is a diagram of an example element j from FIG. 4A in the horizontal xy-plane.

Looking first to distributed lateral load and rotational stiffness $k_{\theta_i}$, consider the effects of applied moment on top of a monopile with skin friction varying on its surface. FIG. 4A is a diagram 400 of an example monopile with radius R with applied moment 410 around the y-axis, with a rotated horizonal plane of angle θ. The surface of the example monopile is divided into a plurality of elements, with an example element j 420 shown. FIG. 4B is a diagram 450 of the example element j 420 from FIG. 4A in the horizontal xy-plane. From FIGS. 4A-4B, and using the shown coordinate system, a relation may be obtained for distance of the element j 420 from the y-axis.

First, surface area ($\delta A_j$) of the element j 420 may be obtained. The x coordinate to element j can be expressed as:

$$d_j = R \cos \alpha \tag{1}$$

Vertical length of element j for small rotation θ (tan θ≅θ) can be obtained as:

$$Z_j = \theta d_j \tag{2}$$

Therefore, the area of the element j can be obtained using equations (1) and (2) as:

$$\delta A_j = R(\delta\alpha)Z_j = R\theta d_j(\delta\alpha) \tag{3}$$

Using a t-z curve, force per unit area on the element ($T_j$) can be obtained using the elemental area $\delta A_j$. The force on element ($\delta F_j$) may be written as:

$$\delta F_j = T_j(\delta A_j) = R\theta T_j d_j(\delta\alpha) \tag{4}$$

In equation (4), $d_j$ and $T_j$ are functions of α. As such, moving around the pile perimeter, skin friction force on each element ($\delta F_j$) is varying. Moment $\delta M_j$ produced by friction force on the element around the y-axis can be calculated using equations (1)-(4) as:

$$\delta M_j = (\delta F_j)d_j = T_j(\delta A_j)d_j = R\theta T_j d_j^2(\delta\alpha) \tag{5}$$

Therefore, the total moment can be expressed as:

$$M_j = R\theta \int_0^{2\pi} T_j d_j^2 d\alpha \tag{6}$$

Integrating equation (6) numerically results in the total moment produced by skin friction around the y-axis for a corresponding node. Moreover, equations (5) and (6) show that moment produced by element friction is a function of element rotation (θ), and unit force $T_j$ obtained from a t-z curve which is itself a function of element rotation, which may be written as:

$$M_j = M_j(T_j(Z_j(\theta)), \theta) \tag{7}$$

Therefore, rotational stiffness $k_{\theta_i}$ as a derivative of moment with respect to rotation can be written as:

$$\frac{dM_j}{d\theta} = \frac{\partial M_j}{\partial \theta} + \frac{\partial M_j}{\partial T_j}\frac{dT_j}{d\theta} = \frac{\partial M_j}{\partial \theta} + \frac{\partial M_j}{\partial T_j}\frac{\partial T_j}{\partial Z_j}\frac{\partial Z_j}{\partial \theta} \tag{8}$$

Substituting from equations (2) and (5) results in:

$$\frac{d\delta M_j}{d\theta} = RT_j d_j^2(\delta\alpha) + R\theta d_j^3(\delta\alpha)\frac{dT_j}{dZ_j} \tag{9}$$

Therefore, rotational stiffness $k_{\theta_i}$ can be expressed as:

$$k_{\theta_i} = \int_0^{2\pi}\left(\frac{dM_j}{d\theta}\right)d\alpha = 4R\left[\int_0^{\pi/2}T_j d_j^2 d\alpha + \theta\int_0^{\pi/2}\left(\frac{dT_j}{dZ_j}\right)d_j^3 d\alpha\right] \tag{10}$$

Parameters in equation (10) show that, when a t-z curve is used to calculate the distributed moment along the monopile, the rotational stiffness of a given node is a function of both the values of $T_j$ and the slope of the t-z curve ($dT_j/dZ_j$).

Figure 5:
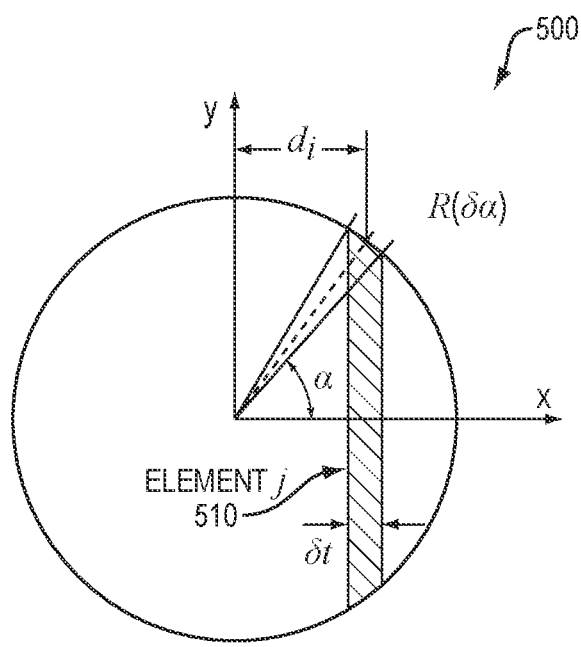
FIG. 5 is a diagram of a pile tip with an example element j.

One may look next to base moment at the monopile's tip and base rotational stiffness. FIG. 5 is a diagram 500 of a pile tip with an example element j 510. The base moment at the tip will be the sum of all moments produced on the elements that make up the surface of the tip. Half of the area of the pile tip is moving upwards, and the soil is in tension. The moment produced by this soil reaction may be ignored. The other half of the pile tip is pushing the soil downward and causes lateral movement of the soul in compression. A p-y curve may be used to calculate this reaction.

In determining the force on an element, its surface area ($\delta A_j$) may be determined. The x coordinate of element j can be expressed as:

$$d_j = R \cos \alpha \tag{11}$$

Vertical length of element j due to pile tip rotation ($\theta_b$) of element j can be obtained as:

$$Z_j = \theta_b d_j \tag{12}$$

Since perimeter of a circle is perpendicular to its radius, the width of the element (St) can be expressed as:

$$\delta t \approx R \sin \alpha(\delta\alpha) \tag{13}$$

The area of the element j on the pile tip surface, shown in FIG. 5, using equation (13) can be expressed as:

$$\delta A_j = 2R \sin \alpha(\delta t) = 2R^2 \sin^2\alpha(\delta\alpha) \tag{14}$$

Using a p-y curve, force per unit area on the element ($P_j$) can be obtained using the vertical displacement Z. Therefore, total force on element ($\delta F_j$) may be written as:

$$\delta F_j = P_j \delta A_j = 2R^2 \sin^2\alpha P_j(\delta\alpha_j) \tag{15}$$

In equation (15), $P_j$ is a function of a. In other words, rotation of the pile tip surface results in variation of force on each element $\delta F_j$. Moment $M_j$ produced by lateral movement of the pile tip with respect to the x-axis on the element around the y-axis may be calculated using equations (11)-(15) as follows:

$$\delta M_b = (\delta F_j) Z_j = P_j(\delta A_j) Z_j = 2R^2 \sin^2\alpha P_j \theta_b d_j(\delta\alpha) \tag{16}$$

Therefore, the base moment ($M_b$) can be obtained by integrating equation (16) with respect to $\alpha$, such that:

$$M_b = 2R^2 \theta_b \int_0^{\pi/2} (P_j d_j \sin^2\alpha) d\alpha \tag{17}$$

Integrating equation (17) numerically results in the total base moment produced due to lateral soil resistance at the pile tip around the y-axis. Integration limits between 0 and $\pi/2$ will cover half of the pile tip area. Equations (16) and (17) show that moment produced by the element displacement is a function of element rotation ($\theta_b$), and unit force ($P_j$) obtained from a p-y curve, which is itself a function of element rotation, such that:

$$M_b = M_b(P_j(Z_j(\theta_b)), \theta_b) \tag{18}$$

Therefore, rotational stiffness is given as the derivative of moment with respect to rotation, such that:

$$\frac{dM_b}{d\theta_b} = \frac{\partial M_b}{\partial \theta_b} + \frac{\partial M_b}{\partial P_j}\frac{\partial P_j}{\partial \theta_b} = \frac{\partial M_b}{\partial \theta_b} + \frac{\partial M_b}{\partial P_j}\frac{\partial P_j}{\partial Z_j}\frac{\partial Z_j}{\partial \theta_b} \tag{19}$$

Substituting from equations (12) and (16) results in:

$$\frac{dM_b}{d\theta_b} = 2R^2 \sin^2\alpha P_j d_j(\delta\alpha) + 2R^2 \sin^2\alpha \theta_b d_j^2(\delta\alpha)\frac{dP_j}{dZ_j} \tag{20}$$

Therefore, base rotational stiffness $K_{M_b}$ can be expressed as:

$$K_{M_b} = \tag{21}$$

$$\int_{-\frac{\pi}{2}}^{\frac{\pi}{2}} \left(\frac{dM_b}{d\theta_b}\right) d\alpha = 2R^2 \left[\int_0^{\frac{\pi}{2}} P_j d_j(\sin^2\alpha) d\alpha + \theta_b \int_0^{\frac{\pi}{2}} \left(\frac{dP_j}{dZ_j}\right) d_j^2(\sin^2\alpha) d\alpha\right]$$

Parameters in equation (21) show that, when a p-y curve is used to calculate the base moment at the pile tip, the corresponding rotational stiffness is a function of both the values of $P_j$ and the slope of the p-y curve ($dP_j/dZ_j$).

One may finally look to base shear force at the pile tip and base shear stiffness $K_{V_b}$. As can be observed in FIG. 5, lateral displacement of the pile tip results in mobilization of skin friction on the pile tip area as the soil reaction. A t-z curve can be used to calculate the reaction force as base shear on the area. For the pile tip displacement $X_b$ and using a t-z curve, force per unit area ($T_b$) on the pile tip area ($\pi R^2$) can be obtained as:

$$F_b = T_b(\pi R^2) \tag{22}$$

Equation (22) shows that shear force produced by the skin friction is a function of unit force $T_b$ obtained from the t-z curve, which is itself a function of displacement, written as:

$$F_b = F_b(T_b(X_b)) \tag{23}$$

Therefore, stiffness may be written as:

$$\frac{dF_b}{dX_b} = \frac{\partial F_b}{\partial T_b}\frac{\partial T_b}{\partial X_b} \tag{24}$$

Substituting from equation (22) results in:

$$K_{V_b} = \frac{dF_b}{dX_b} = \pi R^2 \frac{dT_b}{dX_b} \tag{25}$$

Equations (22) and (25) show that values obtained from a t-z curve and its slope ($dT_b/dX_b$) multiplied by the pile tip area ($\pi R^2$) can be used as the base shear force and base shear stiffness, respectively.

Figure 6:
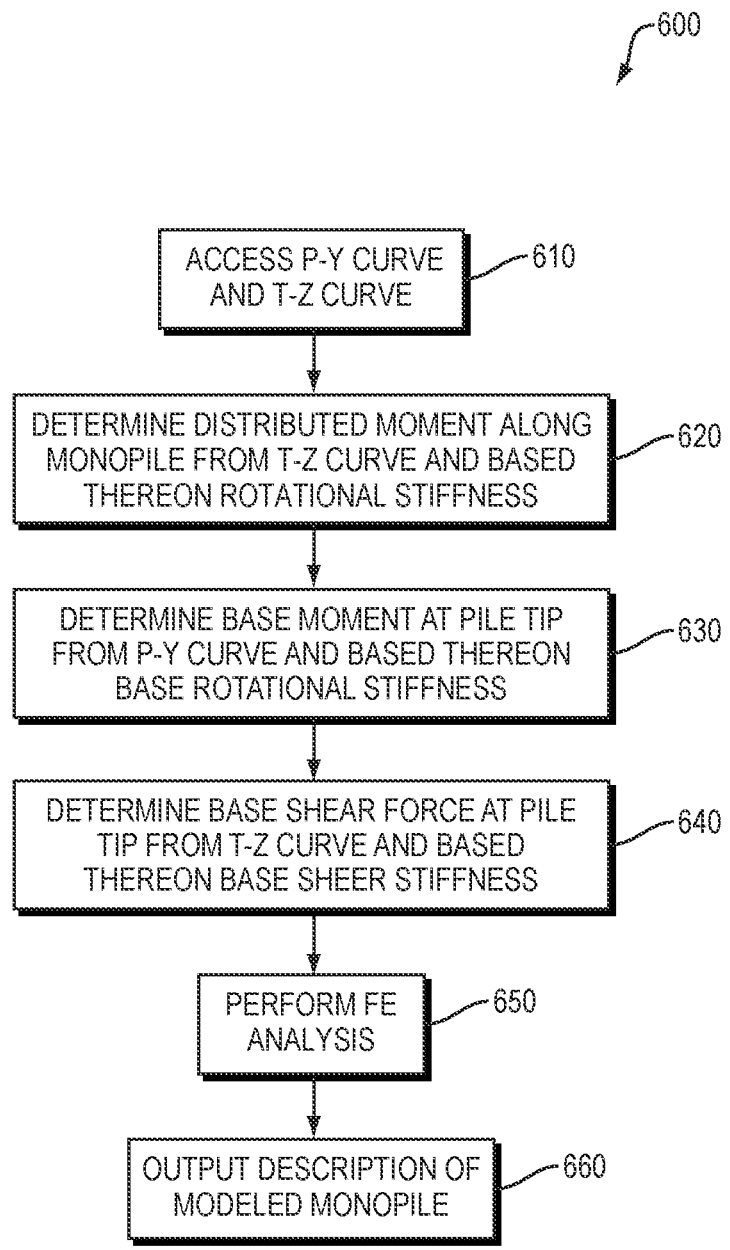
FIG. 6 is a flow diagram of an example sequence of steps which summarize the operations that may be performed by the structural analysis and design software to model a monopile using the new model.

FIG. 6 is a flow diagram of an example sequence of steps 600 which summarize operations that may be performed by the structural analysis and design software to model a monopile using the new model. At step 610, the soil input (soilin) module 120 of the software accesses a p-y curve and a t-z curve for a type of soil about the monopile at each. At step 620, the FE soil (fesoil) module 134 of the software determines a distributed moment along the monopile from a t-z curve and based thereon determines a rotational stiffness of a given node. The FE soil (fesoil) module 134 adds the rotational stiffness to the structural stiffness matrix. At step 630, the FE soil (fesoil) module 134 of the software determines a base moment at the monopile's tip from a p-y curve and based thereon determines a base rotational stiffness. The FE soil (fesoil) module 134 of the software adds the base rotational stiffness to the structural stiffness matrix. At step 640, the FE soil (fesoil) module 134 determines base shear force at the pile tip from a t-z curve and based thereon determines base shear stiffness. The FE soil (fesoil) module 134 adds the base shear force to the structural stiffness matrix. At step 650, the FE solver (fesolve) module of the software performs FE analysis to model the monopile. The FE solver (fesolve) 138 iteratively solves a system of non-linear equations, updating the structural stiffness matrix and a load vector over each of a plurality of load steps, until convergence. Finally, at step 660, the software outputs (e.g., displays on a display screen, stores to memory/storage device, provides it to other software, etc.) a description (e.g., a copy, analysis, visualization, etc.) of the modeled monopile.

The above-described techniques may have a number of advantages over techniques that use a conventional Winkler Model or PISA model. The new model may avoid overly conservative designs for large diameter piles (e.g., 10 m+) with small length-to-diameter ratios (e.g., ≤6, for instance ≥2 but ≤6). It may further use only standardized reaction curves (i.e., p-y curves and t-z curves). Likewise, it may consider both axial and combined loading. Such advantages may lead to better monopile designs (e.g., that are not overly conservative while properly consider all loading), and also may improve computation efficiency (e.g., by removing the need to perform additional field testing or and then calculating additional, non-standard reaction curves).

It should be understood that a wide variety of adaptations and modifications may be made to the techniques. While specific example software and hardware is discussed above, it should be understood that the techniques may be implemented using a variety of different types of software, hardware, and combination thereof. Such software may include executable instructions stored in a non-transitory computing device-readable medium, such as a volatile or persistent memory device, a hard-disk, or other data storage. Such hardware may include a variety of types of processors, memory chips, programmable logic circuits, application specific integrated circuits, and/or other types of hardware components that support execution of software. Combinations of software and hardware may be adapted to suit different environments and applications. Above all, it should be understood that the above descriptions are meant to be taken only by way of example.

What is claimed is:

1. A method for modeling monopiles, comprising:
    accessing, by structural analysis and design software executing on one or more computing devices, a p-y curve and a t-z curve for a type of soil for a monopile at each of one or more layers, the monopile including a plurality of nodes in the one or more layers, wherein each p-y curve is a nonlinear function that relates lateral soil reaction force (p) to lateral displacement (y), and each t-z curve is a nonlinear function that relates skin friction (t) to vertical displacement (z);
    determining, by the structural analysis and design software, a distributed moment along the monopile and based thereon a rotational stiffness of a given node, wherein the rotational stiffness is calculated as a function of both force per unit area from a respective t-z curve for the layer of the given node and slope of the respective t-z curve for the layer of the given node;
    determining, by the structural analysis and design software, a base moment at a pile tip of the monopile and based thereon a base rotational stiffness, wherein the base rotational stiffness is calculated as a function of both force per unit area from a respective p-y curve for the layer of the pile tip and slope of the respective p-y curve for the layer of the pile tip;
    determining, by the structural analysis and design software, a base shear force at the pile tip and based thereon base shear stiffness, wherein the base shear stiffness is calculated as a function of slope of a respective t-z curve for the layer of the pile tip and pile tip area;
    iteratively solving, by the structural analysis and design software, a system of non-linear equations that uses a structural stiffness matrix that includes the rotational stiffness, the base rotational stiffness and the base shear stiffness in addition to pile material structural stiffness to model the monopile; and
    outputting, by the structural analysis and design software, a description of the modeled monopile.

2. The method of claim 1, wherein the monopile is a monopile of an offshore wind turbine.

3. The method of claim 1, wherein the monopile has a diameter of 10 meters or more.

4. The method of claim 1, wherein the monopile has a length-to-diameter ratio between 2 and 6 inclusive.

5. The method of claim 1, wherein rotational stiffness ($k_{\theta_i}$) for a node (i) corresponding to an element (j) is calculated as:

$$k_{\theta_i} = \int_0^{2\pi} \left(\frac{dM_j}{d\theta}\right) d\alpha = 4R\left[\int_0^{\pi/2} T_j d_j^2 d\alpha + \theta \int_0^{\pi/2} \left(\frac{dT_j}{dZ_j}\right) d_j^3 d\alpha\right]$$

where $\theta$ is an angle of a rotated horizonal plane from an x-axis, $\alpha$ is an angle to the element j in the horizontal plane from the x-axis, R is radius of the monopile, $d_j$ is a distance in the horizonal plane from the y-axis, $M_j$ is total moment, $T_j$ is force per unit area from the respective t-z curve for the layer of the node (i), and $dT_j/dZ_j$ is slope of the respective t-z curve for the layer of the node (i).

6. The method of claim 1, wherein base rotational stiffness ($K_{M_b}$) for base (b) given an element (j) is calculated as:

$$K_{M_b} = \int_{-\frac{\pi}{2}}^{\frac{\pi}{2}} \left(\frac{dM_b}{d\theta_b}\right) d\alpha = 2R^2\left[\int_0^{\frac{\pi}{2}} P_j d_j (\sin^2\alpha) d\alpha + \theta_b \int_0^{\frac{\pi}{2}} \left(\frac{dP_j}{dZ_j}\right) d_j^2 (\sin^2\alpha) d\alpha\right]$$

where $\theta_b$ is pile tip rotation, $\alpha$ is an angle to the element j in the horizonal plane from the x-axis, R is radius of the monopile, $d_j$ is a distance in the pile tip surface from the y-axis, $M_b$ is base moment, $P_j$ is force per unit area from the respective p-y curve for the layer at the pile tip and $dP_j/dZ_j$ is slope of the respective p-y curve for the layer at the pile tip.

7. The method of claim 1, wherein base shear stiffness ($K_{V_b}$), for base (b) is calculated as:

$$K_{V_b} = \pi R^2 \frac{dT_b}{dX_b}$$

where R is radius of the monopile, and $dT_b/dX_b$ is slope of the respective t-z curve for the layer at the pile tip.

8. A computing device comprising:
    a processor; and
    a memory coupled to the processor and configured to store structural analysis and design software, the structural analysis and design software when executed on the processor configured to:
        access a p-y curve and a t-z curve for a type of soil for a monopile at each of one or more layers, the monopile including a plurality of nodes in the one or more layers, wherein each p-y curve is a nonlinear function that relates lateral soil reaction force (p) to lateral displacement (y), and each t-z curve is a nonlinear function that relates skin friction (t) to vertical displacement (z),
        determine a rotational stiffness of a given node as a function of both force per unit area from a respective t-z curve for the layer of the given node and slope of the respective t-z curve for the layer of the given node,
        determine a base rotational stiffness as a function of both force per unit area from a respective p-y curve for the layer of a pile tip and slope of the respective p-y curve for the layer of the pile tip,
        determine a base shear stiffness as a function of slope of a respective t-z curve for the layer of the pile tip and pile tip area, and
        iteratively solve a system of non-linear equations that uses a structural stiffness matrix that includes the rotational stiffness, the base rotational stiffness and the base shear stiffness in addition to pile material structural stiffness to model the monopile.

9. The computing device of claim 8, wherein the monopile is a monopile of an offshore wind turbine.

10. The computing device of claim 8, wherein the monopile has a diameter of 10 meters or more or a length-to-diameter ratio between 2 and 6, inclusive.

11. The computing device of claim 8, wherein rotational stiffness ($k_{\theta_i}$) for a node (i) corresponding to an element (j) is calculated as:

$$k_{\theta_i} = \int_0^{2\pi}\left(\frac{dM_j}{d\theta}\right)d\alpha = 4R\left[\int_0^{\pi/2} T_j d_j^2 d\alpha + \theta \int_0^{\pi/2}\left(\frac{dT_j}{dZ_j}\right)d_j^3 d\alpha\right]$$

where $\theta$ is an angle of a rotated horizonal plane from an x-axis, $\alpha$ is an angle to the element j in the horizonal plane from the x-axis, R is radius of the monopile, $d_j$ is a distance in the horizonal plane from the y-axis, $M_j$ is total moment, $T_j$ is force per unit area from the respective t-z curve for the layer of the node (i), and $dT_j/dZ_j$ is slope of the respective t-z curve for the layer of the node (i).

12. The computing device of claim 8, wherein base rotational stiffness ($K_{M_b}$) for base (b) given an element (j) is calculated as:

$$K_{M_b} = \int_{-\frac{\pi}{2}}^{\frac{\pi}{2}}\left(\frac{dM_b}{d\theta_b}\right)d\alpha = 2R^2\left[\int_0^{\frac{\pi}{2}} P_j d_j(\mathrm{Sin}^2\alpha)d\alpha + \theta_b\int_0^{\frac{\pi}{2}}\left(\frac{dP_j}{dZ_j}\right)d_j^2(\mathrm{Sin}^2\alpha)d\alpha\right]$$

where $\theta_b$ is pile tip rotation, $\alpha$ is an angle to the element j in the horizontal plane from the x-axis, R is radius of the monopile, $d_j$ is a distance in the pile tip surface from the y-axis, $M_b$ is base moment, $P_j$ is force per unit area from the respective p-y curve for the layer of the pile tip and $dP_j/dZ_j$ is slope of the respective p-y curve for the layer of the pile tip.

13. The computing device of claim 8, wherein base shear stiffness ($K_{V_b}$) for base (b) is calculated as:

$$K_{V_b} = \pi R^2 \frac{dT_b}{dX_b}$$

where R is radius of the monopile, and $dT_b/dX_b$ is slope of the respective t-z curve for the layer of at the pile tip.

14. A non-transitory computing device readable medium having instructions stored thereon, the non-transitory computing device readable medium being a volatile or persistent memory device or a hard-disk, the instructions when executed by one or more computing devices operable to:
  access a p-y curve and a t-z curve for a type of soil for a monopile at each of one or more layers, the monopile including a plurality of nodes in the one or more layers, wherein each p-y curve is a nonlinear function that relates lateral soil reaction force (p) to lateral displacement (y), and each t-z curve is a nonlinear function that relates skin friction (t) to vertical displacement (z);
  determine a distributed moment along the monopile and based thereon a rotational stiffness of a given node, wherein the rotational stiffness is calculated as a function of both force per unit area from a respective t-z curve for the layer of the given node and slope of the t-z curve for the layer of the given node;
  determine a base moment at a pile tip of the monopile and based thereon a base rotational stiffness, wherein the base rotational stiffness is calculated as a function of both force per unit area from a respective p-y curve for the layer of the pile tip and slope of the respective p-y curve for the layer of the pile tip;
  determine a base shear force at the pile tip from the t-z curve and based thereon base shear stiffness, wherein the base shear stiffness is calculated as a function of slope of a respective t-z curve for the layer of the pile tip and pile tip area;
  iteratively solve a system of non-linear equations that uses a structural stiffness matrix that includes the rotational stiffness, the base rotational stiffness and the base shear stiffness in addition to pile material structural stiffness to model the monopile; and
  output a description of the modeled monopile.

15. The non-transitory computing device readable medium of claim 14, wherein the monopile is a monopile of an offshore wind turbine.

16. The non-transitory computing device readable medium of claim 14, wherein the monopile has a diameter of 10 meters or more.

17. The non-transitory computing device readable medium of claim 14, wherein the monopile has a length-to-diameter ratio between 2 and 6, inclusive.

18. The non-transitory computing device readable medium of claim 14, wherein rotational stiffness ($k_{\theta_i}$) for a node (i) corresponding to an element (j) is calculated as:

$$k_{\theta_i} = \int_0^{2\pi}\left(\frac{dM_j}{d\theta}\right)d\alpha = 4R\left[\int_0^{\pi/2} T_j d_j^2 d\alpha + \theta \int_0^{\pi/2}\left(\frac{dT_j}{dZ_j}\right)d_j^3 d\alpha\right]$$

where $\theta$ is an angle of a rotated horizonal plane from an x-axis, $\alpha$ is an angle to the element j in the horizonal plane from the x-axis, R is radius of the monopile, $d_j$ is a distance in the horizonal plane from the y-axis, $M_j$ is total moment, $T_j$ is force per unit area from the respective t-z curve for the layer of the node (i), and $dT_j/dZ_j$ is slope of the respective t-z curve for the layer of the node (i).

19. The non-transitory computing device readable medium of claim 14, wherein base rotational stiffness ($K_{M_b}$) for base (b) given an element (j) is calculated as:

$$K_{M_b} = \int_{-\frac{\pi}{2}}^{\frac{\pi}{2}}\left(\frac{dM_b}{d\theta_b}\right)d\alpha = 2R^2\left[\int_0^{\frac{\pi}{2}} P_j d_j(\mathrm{Sin}^2\alpha)d\alpha + \theta_b\int_0^{\frac{\pi}{2}}\left(\frac{dP_j}{dZ_j}\right)d_j^2(\mathrm{Sin}^2\alpha)d\alpha\right]$$

where $\theta_b$ is pile tip rotation, $\alpha$ is an angle to the element j in the horizontal plane from the x-axis, R is radius of the monopile, $d_j$ is a distance in the pile tip surface from the y-axis, $M_b$ is base moment, $P_j$ is force per unit area from the respective p-y curve for the layer of at the pile tip and $dP_j/dZ_j$ is slope of the respective p-y curve for the layer of at the pile tip.

20. The non-transitory computing device readable medium of claim 14, wherein base shear stiffness ($K_{V_b}$), for base (b) is calculated as:

$$K_{V_b} = \pi R^2 \frac{dT_b}{dX_b}$$

where R is radius of the monopile, and $dT_b/dX_b$ is slope of the respective t-z curve for the layer of at the pile tip.

* * * * *